US012606001B2

(12) United States Patent (10) Patent No.: US 12,606,001 B2
Sekiuchi (45) Date of Patent: Apr. 21, 2026

(54) RESTRICTION APPARATUS

(71) Applicant: Isuzu Motors Limited, Yokohama (JP)

(72) Inventor: Takahiro Sekiuchi, Kanagawa (JP)

(73) Assignee: Isuzu Motors Limited, Yokohama (JP)

( * ) Notice: Subject to any disclaimer, the term of this patent is extended or adjusted under 35 U.S.C. 154(b) by 313 days.

(21) Appl. No.: 18/427,913

(22) Filed: Jan. 31, 2024

(65) Prior Publication Data

US 2024/0253445 A1 Aug. 1, 2024

(30) Foreign Application Priority Data

Feb. 1, 2023 (JP) ................................. 2023-014064

(51) Int. Cl.
*B60K 1/04* (2019.01)
*H01M 50/262* (2021.01)

(52) U.S. Cl.
CPC ............. *B60K 1/04* (2013.01); *H01M 50/262* (2021.01); *H01M 2220/20* (2013.01)

(58) Field of Classification Search
CPC ... B60K 2001/0455; B60K 2001/0461; H01M 2220/20; H01M 50/262; H01M 50/264
See application file for complete search history.

(56) References Cited

U.S. PATENT DOCUMENTS

| | | | | |
|---|---|---|---|---|
| 4,275,131 A | * | 6/1981 | Richards | H01M 10/12 429/100 |
| 4,632,201 A | * | 12/1986 | Kay | H01M 50/249 180/68.5 |

| | | | | |
|---|---|---|---|---|
| 5,301,765 A | * | 4/1994 | Swanson | B60K 1/04 180/68.5 |
| 5,585,205 A | * | 12/1996 | Kohchi | H01M 50/209 180/68.5 |
| 5,760,569 A | * | 6/1998 | Chase, Jr. | H01M 50/204 414/281 |
| 6,631,775 B1 | * | 10/2003 | Chaney | B60L 53/80 280/783 |
| 7,712,563 B2 | * | 5/2010 | Niebuhr | B60L 50/66 180/311 |
| 7,828,099 B2 | * | 11/2010 | Heckeroth | B60K 1/00 180/2.2 |
| 8,237,403 B2 | * | 8/2012 | Ishii | H01M 10/488 320/112 |
| 8,517,131 B2 | * | 8/2013 | Kovach | H01M 50/249 180/68.5 |
| 8,852,794 B2 | * | 10/2014 | Laitinen | H01M 50/204 429/149 |

(Continued)

FOREIGN PATENT DOCUMENTS

| | | |
|---|---|---|
| EP | 2230142 | 9/2010 |
| EP | 2840056 | 2/2015 |

(Continued)

*Primary Examiner* — Jeffrey J Restifo

(57) ABSTRACT

A restriction apparatus includes a contact section that restricts movement of a placement portion toward a mounting position, and a switching section that switches a position of the contact section between a contact position and a non-contact position, the contact position being where the contact section makes contact with the support portion when the battery is not placed on the placement portion, the non-contact position being where the contact section does not make contact with the support portion when the battery is placed on the placement portion.

5 Claims, 4 Drawing Sheets

(56)                    References Cited

U.S. PATENT DOCUMENTS

| | | | | |
|---|---|---|---|---|
| 9,352,728 | B2 * | 5/2016 | Corfitsen | ................ B60L 53/80 |
| 9,358,895 | B2 * | 6/2016 | Avganim | ................ B60K 1/04 |
| 9,566,954 | B2 * | 2/2017 | Moskowitz | ............. B60K 1/04 |
| 9,827,840 | B2 * | 11/2017 | Wen | .................... H01M 50/249 |
| 9,850,114 | B2 * | 12/2017 | Gilland | ................ B66F 9/0754 |
| 9,873,409 | B2 * | 1/2018 | Corfitsen | ................ B60K 1/04 |
| 10,752,102 | B2 * | 8/2020 | Lampsa | ................. B60L 58/21 |
| 11,065,967 | B2 * | 7/2021 | Confer | ............... H01M 50/249 |
| 11,233,291 | B2 * | 1/2022 | Confer | ............... H01M 50/264 |
| 11,444,352 | B2 * | 9/2022 | Iacovoni | ................ B60L 50/66 |
| 11,613,172 | B2 * | 3/2023 | Yun | .................... H01M 10/425 |
| | | | | 180/68.5 |
| 11,912,155 | B2 * | 2/2024 | Zhang | ................ H01M 50/204 |
| 12,233,741 | B2 * | 2/2025 | Gaussin | ................... B60K 1/04 |
| 2023/0373284 | A1 * | 11/2023 | Zhang | ................ H01M 50/249 |

FOREIGN PATENT DOCUMENTS

| | | | |
|---|---|---|---|
| JP | | 2002-352261 | 12/2002 |
| JP | | 2002-362261 | 12/2002 |

* cited by examiner

RESTRICTION APPARATUS

RELATED APPLICATION

This application claims the benefit of priority of Japanese Patent Application No. 2023-014064 filed on Feb. 1, 2023, the contents of which are incorporated by reference as if fully set forth herein in their entirety.

TECHNICAL FIELD

The present disclosure relates to a restriction apparatus.

BACKGROUND ART

Conventionally, in a vehicle including a battery, such as an electric vehicle or a hybrid vehicle, the battery is fixed to a vehicle body inside the vehicle. For example, Patent Literature (hereinafter, referred to as "PTL") 1 discloses a configuration including a main lock apparatus and a fail-safe lock apparatus for preventing a battery from falling due to an unlocked state of the main lock apparatus caused by a malfunction or the like.

CITATION LIST

Patent Literature

PTL 1
Japanese Patent Application Laid-Open No. 2002-362261

SUMMARY OF INVENTION

Technical Problem

Meanwhile, some vehicles have a configuration in which a battery can be pulled out of and housed in the vehicles between the inside and the outside of the vehicles via a slide portion. In this configuration, there is a possibility that, when the battery is pulled out to the outside of the vehicle in order to replace the battery, a placement portion for placement of the battery returns to the inside of the vehicle at a timing unintended by the operator due to the tilted state of the vehicle parked.

An object of the present disclosure is to provide a restriction apparatus capable of suppressing a placement portion for replacement of a battery from returning to the inside of a vehicle at a timing unintended by an operator.

Solution to Problem

A restriction apparatus according to the present disclosure is a restriction apparatus disposed in a mechanism including a placement portion and a support portion, the placement portion being movable between a mounting position at which a battery is mountable and a replacement position, the support portion being configured to support the placement portion at the mounting position, the restriction apparatus including:
a contact section that makes contact with the support portion to limit movement of the placement portion toward the mounting position in a state in which the placement portion is in the replacement position; and
a switching section that switches a position of the contact section between a contact position and a non-contact position, the contact position being where the contact section makes contact with the support portion when the battery is not placed on the placement portion, the non-contact position being where the contact section does not make contact with the support portion when the battery is placed on the placement portion.

Advantageous Effects of Invention

According to the present disclosure, it is possible to prevent the placement portion for placement of the battery from returning to the inside of the vehicle at a timing unintended by the operator.

DESCRIPTION OF EMBODIMENTS

Figure 1:
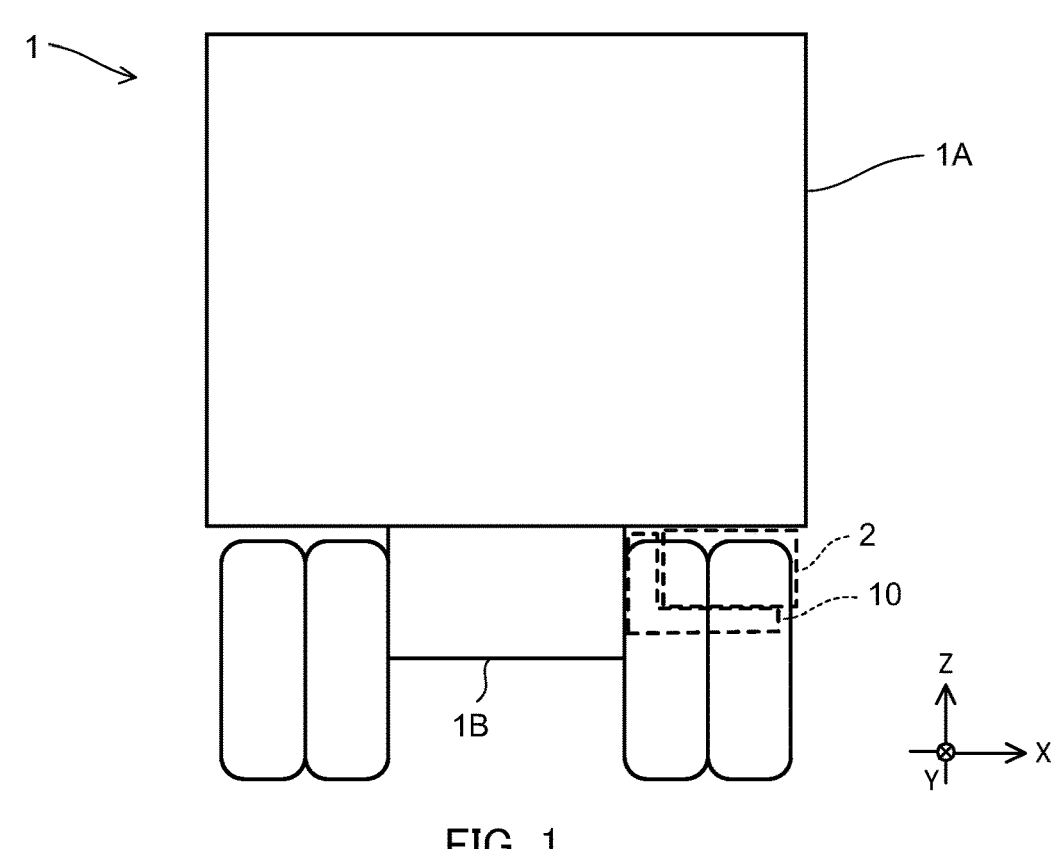
FIG. 1 is a diagram illustrating a vehicle including a restriction apparatus according to an embodiment of the present disclosure.

Hereinafter, embodiments of the present disclosure will be described in detail based on the drawings. FIG. 1 is a diagram illustrating a vehicle including a restriction apparatus according to an embodiment of the present disclosure.

In describing the configuration of the restriction apparatus of the present embodiment, an orthogonal coordinate system (X, Y, Z) is used. The same orthogonal coordinate system (X, Y, Z) is also used for illustration of below-mentioned figures. The X-direction indicates the left-right direction of vehicle 1 on which the restriction apparatus is mounted, the Y-direction indicates the front-rear direction of vehicle 1, and the Z-direction indicates the up-down direction of vehicle 1.

As illustrated in FIG. 1, vehicle 1 is such a vehicle as an electric vehicle or a hybrid vehicle which can travel by battery 2. Vehicle 1 is also a large vehicle such as a truck, and is equipped with loading platform 1A. In addition, attachment apparatus 10 for attachment of battery 2 is disposed on vehicle body 1B of vehicle 1 on which loading platform 1A is mounted.

Figure 2:
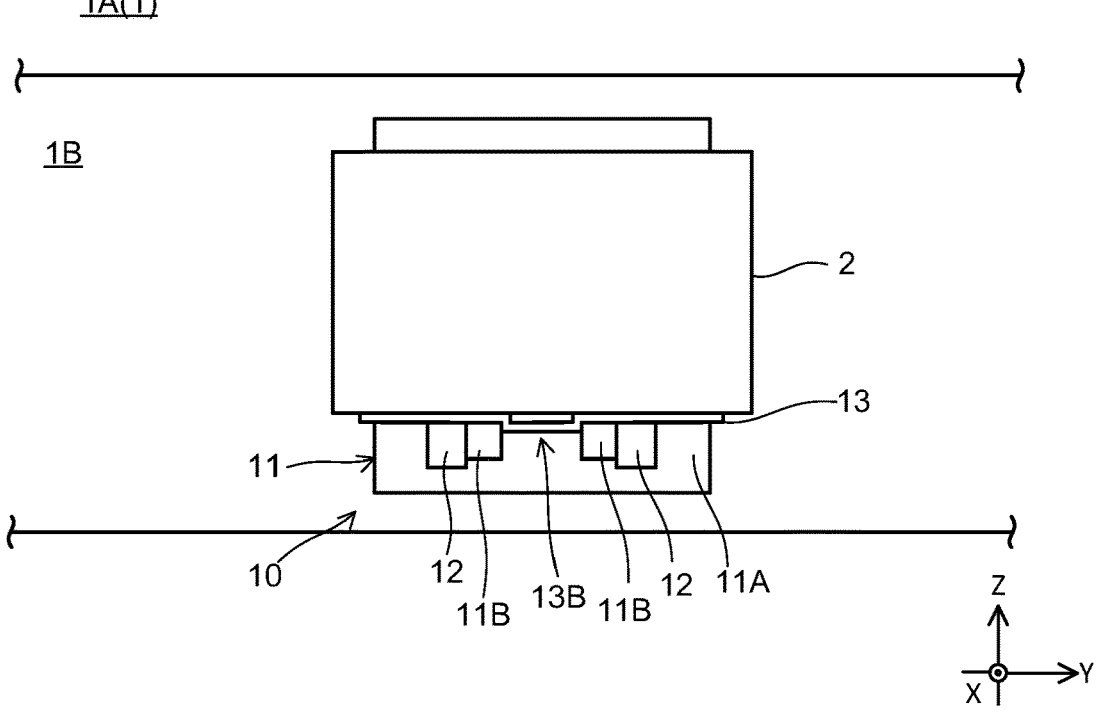
FIG. 2 is a view of the restriction apparatus according to the present embodiment as viewed in the X-direction.
Figure 4:
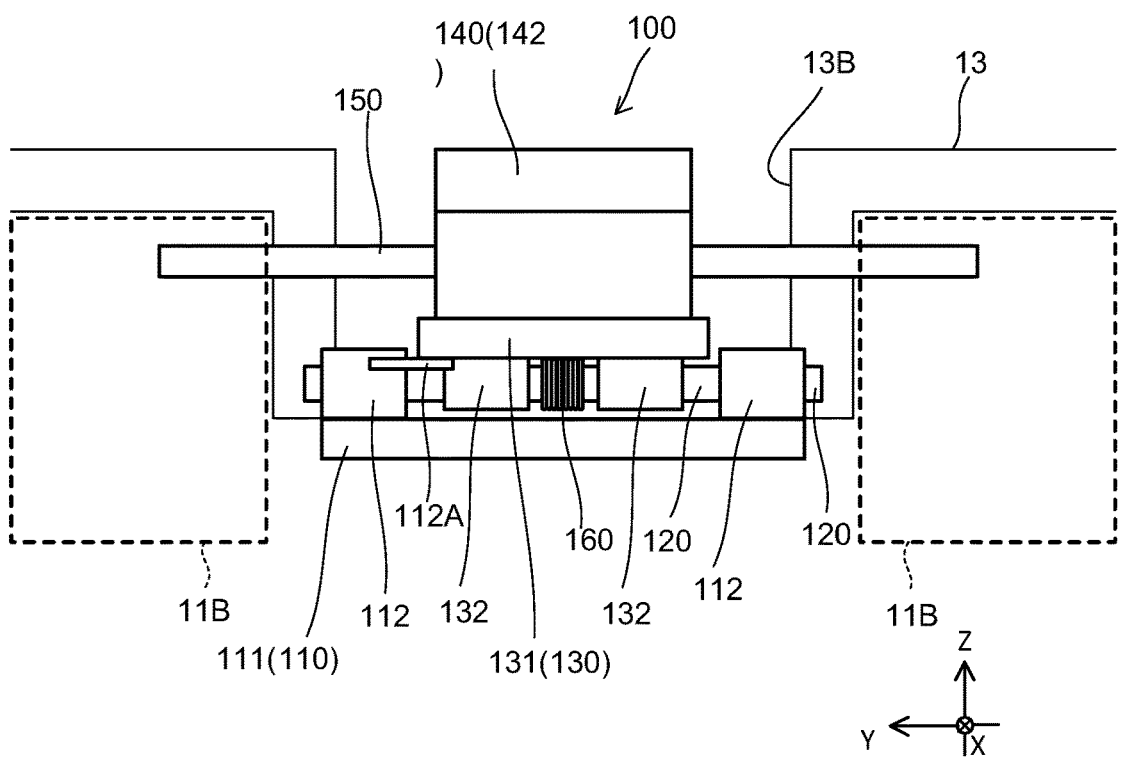
FIG. 4 is a view of a restriction section viewed in the X-direction.
Figure 5:
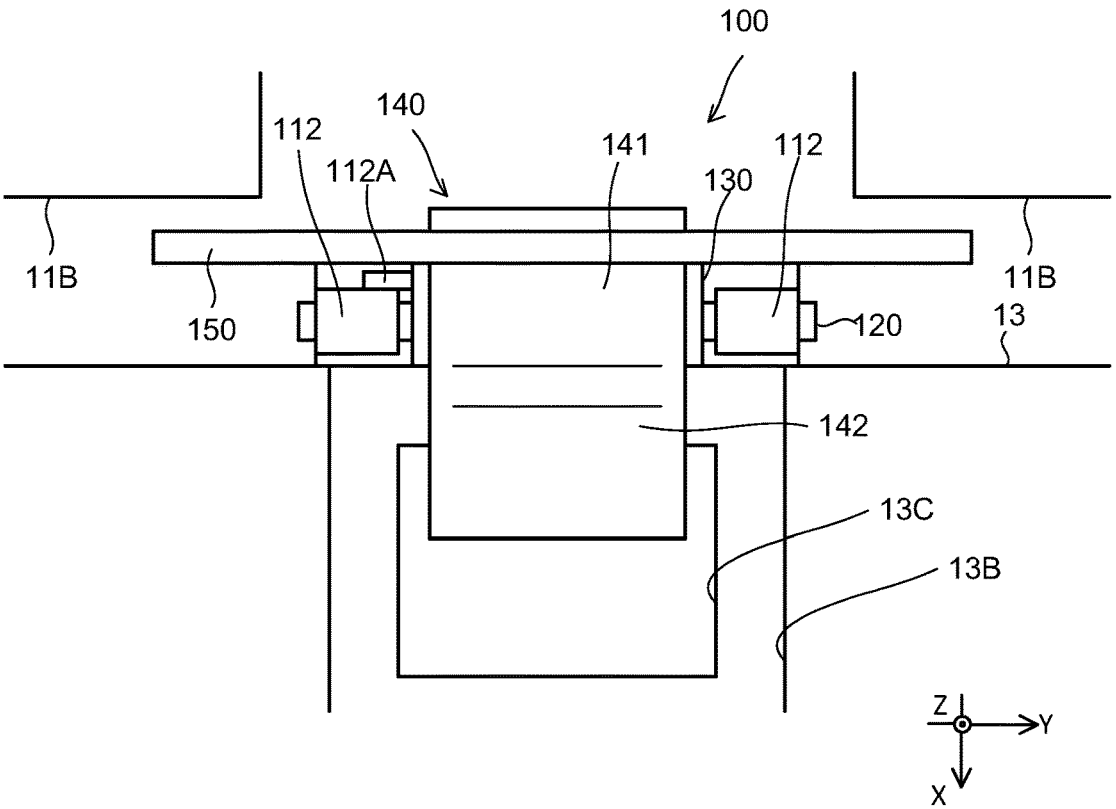
FIG. 5 is a view of the restriction section viewed in the Z-direction.

As illustrated in FIG. 2, attachment apparatus 10 includes main body portion 11, slide portions 12, placement portion 13, and restriction section 100 (see FIGS. 4 and 5).

Main body portion 11 is disposed at a position corresponding to the lower side (the − side in the Z-direction) of loading platform 1A, and includes wall portion 11A and support portions 11B.

Wall portion 11A is a wall disposed along the Z-direction, and is fixed to, for example, a side surface (the + side in the X-direction) of vehicle body 1B. Wall portion 11A is provided with latch 11C that is engaged with striker 2A disposed on the side surface of battery 2 (see FIG. 3B). When latch 11C and striker 2A are engaged with each other, battery 2 is fixed to vehicle 1.

Support portions 11B are members extending toward the + side in the X-direction from the end portion of wall portion 11A on the − side in the Z-direction, and two support portions are disposed alongside with each other in the Y-direction. Support portions 11B are disposed to support placement portion 13 and battery 2 from the − side in the Z-direction when battery 2 is fixed to vehicle 1.

Slide portions 12 are a telescopic slide rail for moving battery 2 between the inner position in vehicle 1 and the outer position. Slide portions 12, for example, are fixed to support portions 11B. Two slide portions are disposed so as to sandwich two support portions 11B.

Figure 3A:
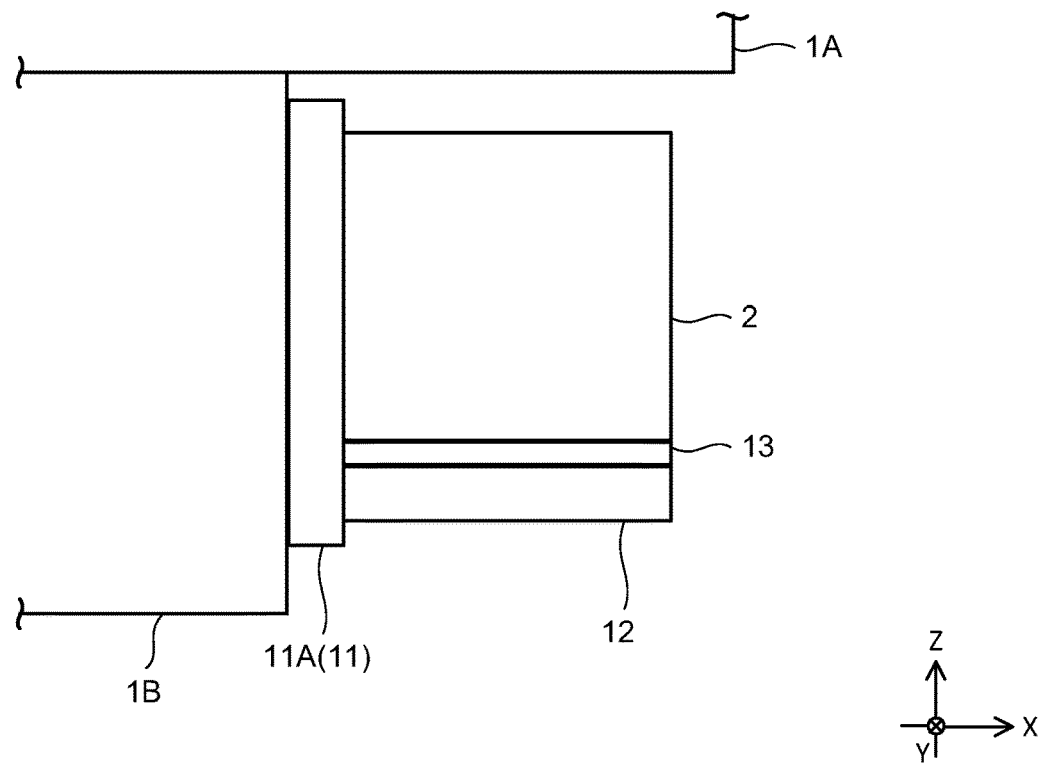
FIG. 3A is a diagram for explaining movement of a battery between an inner position and an outer position.

As illustrated in FIG. 3A, slide portions 12 are located in the inner range of vehicle 1 in the X-direction when being in the most retracted state. The above-described inner position is a position where battery 2 is not positioned outside vehicle 1 in the X-direction, and may be, for example, a position of battery 2 (placement portion 13) when slide portions 12 are in the most retracted state. The inner position may be a mounting position of battery 2 in vehicle 1.

Figure 3B:
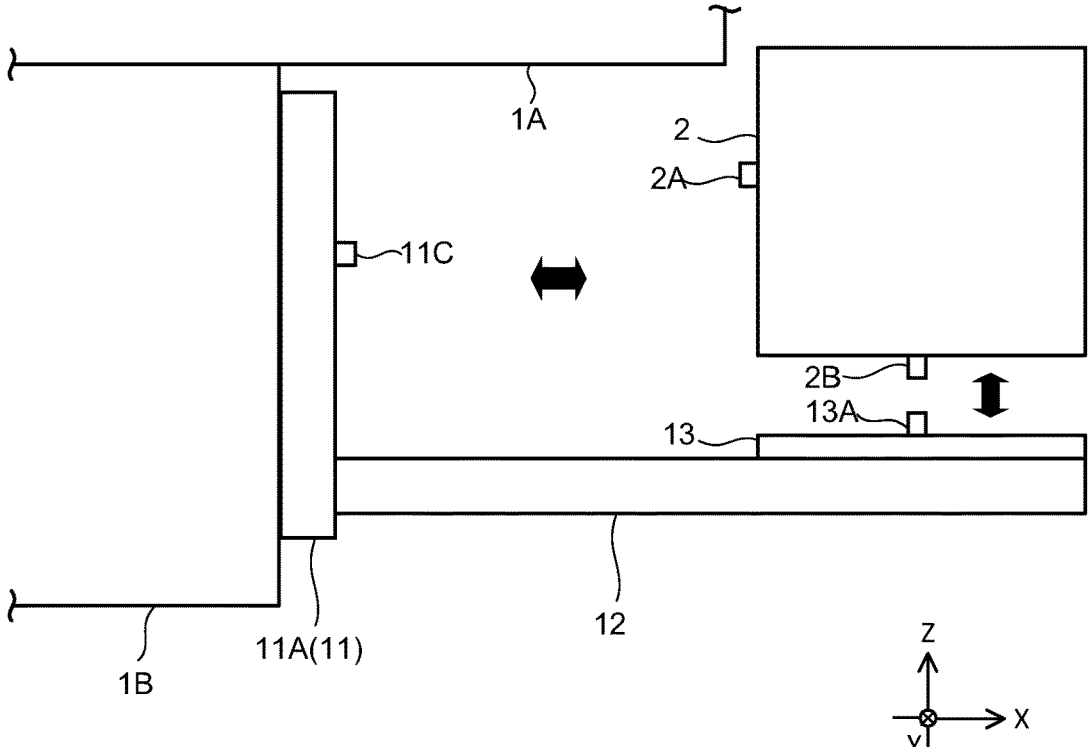
FIG. 3B is a diagram for explaining the movement of the battery between the inner position and the outer position.

As illustrated in FIG. 3B, when slide portions 12 are in the most extended position, the distal end portions are located on the + side in the X-direction with respect to loading platform 1A, that is, in a range outside vehicle 1. The above-described outer position is a position outside vehicle 1 in the X-direction at which battery 2 is detachable from placement portion 13, and may be, for example, a position of battery 2 (placement portion 13) in a state where slide portions 12 are most extended. The outer position may also be a replacement position for replacement of battery 2.

Placement portion 13 is a portion on which battery 2 is placed. Placement portion 13 is formed in a plate shape, and is attached to slide portions 12 at positions corresponding to slide portions 12. Latch 13A to be engaged with striker 2B disposed on a bottom surface of battery 2 is disposed on a surface of placement portion 13 on the + side in the Z-direction. When latch 13A and striker 2B are engaged with each other, battery 2 is fixed to placement portion 13.

Further, when latch 13A and striker 2B are disengaged from each other when placement portion 13 is positioned in the range outside vehicle 1, battery 2 can be detached and replaced.

Further, as illustrated in FIG. 4, groove portion 13B extending in the X-direction is formed in a middle portion of placement portion 13 in the Y-direction. Groove portion 13B is located at a part of placement portion 13 between two support portions 11B when placement portion 13 is disposed at the inner position. Accordingly, placement portion 13 is supported by support portions 11B at both sides of groove portion 13B when positioned at the inner position (see also FIG. 2).

Further, as illustrated in FIG. 5, through-hole 13C is formed in a part of groove portion 13B at an end portion of placement portion 13 on the − side in the X-direction, and restriction section 100 is disposed on a part of the groove portion on the − side of through-hole 13C in the X-direction.

Restriction section 100 is for restricting a return of placement portion 13 on which battery 2 is not placed to the inner position when placement portion 13 is positioned at the outer position. As illustrated in FIGS. 4 and 5, restriction section 100 includes fixed member 110, rotation shaft 120, attachment member 130, rotation member 140, contact member 150, and biasing member 160.

Fixed member 110 is fixed to the end portion of placement portion 13 on the − side in the X-direction, and includes fixed portion 111 and bearing section 112.

Fixed portion 111 is formed in a plate shape, and is fixed to a surface of placement portion 13 on the − side in the Z-direction. An end portion of fixed portion 111 opposite the end portion to be fixed is disposed to protrude from placement portion 13, and is provided with bearing section 112.

Bearing section 112 are portions that carry rotation shaft 120. Bearing section 112 includes two cylindrical portions spaced apart from each other in the Y-direction, and is disposed on the + side of fixed portion 111 in the Z-direction.

Further, on the outer surface of one of the two cylindrical portions of bearing section 112, stopper 112A for restricting the rotation of rotation member 140 (first extension portion 141) toward the − side in the Z-direction from a position (the first position illustrated in FIG. 6A) of rotation member 140 extending along the XY plane.

Stopper 112A is disposed so as to protrude toward the − side in the X-direction from an end portion of bearing section 112 on the − side in the X-direction and to be positioned in a range where attachment member 130 (attachment main body portion 131) is disposed.

By disposing stopper 112A as described above, the rotation of rotation member 140 toward the − side in the Z-direction relative to stopper 112A is restricted via attachment member 130.

Rotation shaft 120 is for rotation of rotation member 140, and is disposed along the Y-direction.

Attachment member 130 is for attachment of rotation member 140 to rotation shaft 120, and includes attachment main body portion 131 and shaft attachment portions 132.

Attachment main body portion 131 is a portion to which rotation member 140 is attached, and is formed of a plate-shaped member.

Shaft attachment portions 132 are portions disposed on an end portion of a surface of attachment main body portion 131 on the − side in the Z-direction and attached to rotation shaft 120. Shaft attachment portions 132 include two cylindrical portions spaced apart from each other in the Y-direction, and are disposed between the two cylindrical portions of bearing section 112.

Figure 6A:
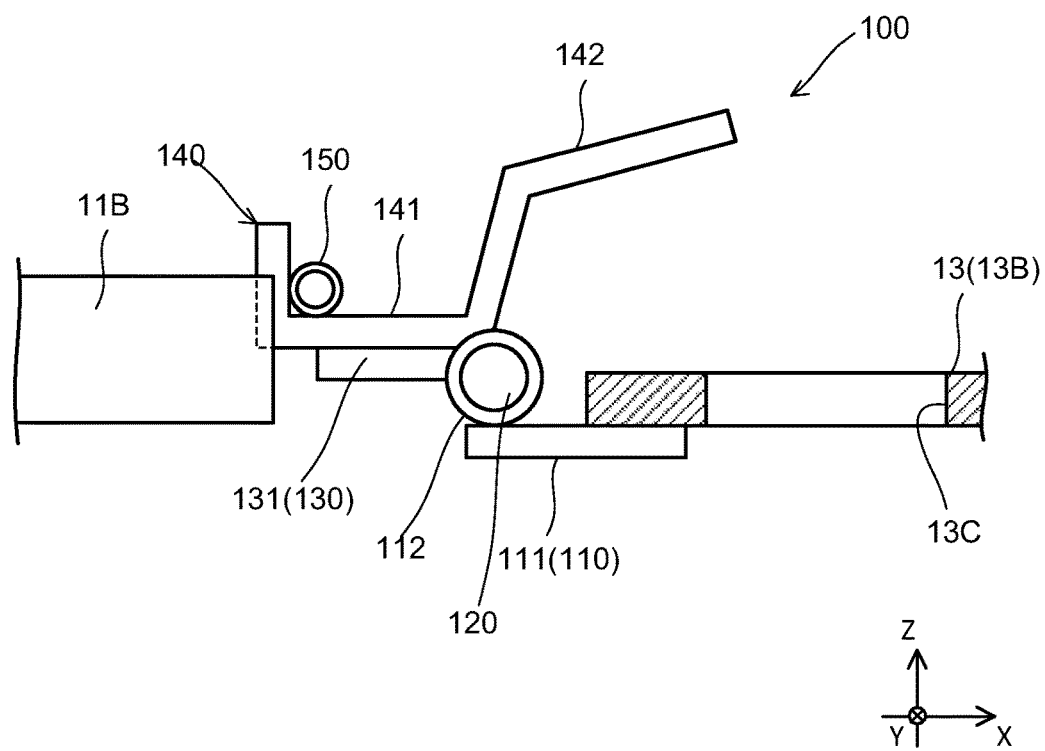
FIG. 6A is a diagram for explaining an operation of the restriction section.
Figure 6B:
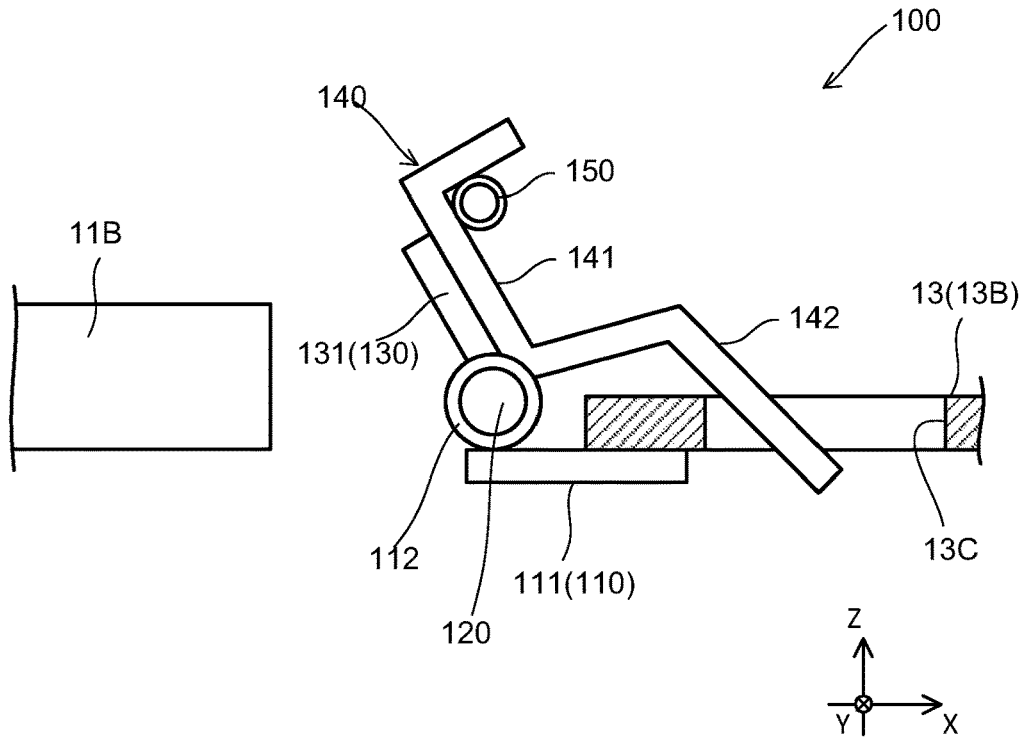
FIG. 6B is a diagram for explaining the operation of the restriction section.

Rotation member 140 rotates contact member 150 about rotation shaft 120, and is attached to the + side of attachment main body portion 131 in the Z-direction. As illustrated in FIGS. 6A and 6B, rotation member 140 is configured to be rotatable between the first position and the second position, and includes first extension portion 141 and second extension portion 142.

The first position is a position of rotation member 140 during when contact member 150 is disposed at a contact position where the contact member is capable of making contact with support portions 11B. The second position is a position of rotation member 140 during when contact member 150 is disposed at a non-contact position where the contact member does not make contact with support portions 11B.

First extension portion 141 is a portion attached to attachment main body portion 131 and, at the distal end portion, supports contact member 150. In a case where rotation member 140 is located at the first position, first extension portion 141 is disposed to extend from a position corresponding to rotation shaft 120 toward the − side in the X-direction, for example. In other words, when contact member 150 is located at the contact position, first extension portion 141 is disposed so as to extend from rotation shaft 120 toward contact portions of support portions 11B making contact with contact member 150.

When positioned at the first position, second extension portion 142 extends from an end portion of first extension portion 141 opposite the end portion that supports contact member 150, that is, from the position corresponding to rotation shaft 120 to the + side in the X-direction (the side opposite of support portions 11B when placement portion 13 is positioned at the outer position), and is disposed at a position sandwiched between placement portion 13 and battery 2.

Specifically, second extension portion 142 is shaped to extend from rotation shaft 120 toward the + side in the Z-direction and then extend in a direction inclined away from placement portion 13 with increasing distance toward the + side in the X-direction (away from support portions 11B) when battery 2 is not placed on placement portion 13 and contact member 150 is located at the contact position.

Further, when battery 2 is placed on placement portion 13, second extension portion 142 is pressed against battery 2, and rotation member 140 is rotated in a direction from the first position toward the + side in the Z-direction. Then, as illustrated in FIG. 6B, the inclined portion of second extension portion 142 enters through-hole 13C in placement portion 13.

That is, rotation member 140 is configured to rotate about rotation shaft 120 between the first position where stopper 112A and first extension portion 141 make contact with each other and the second position where the inclined portion of second extension portion 142 enters through-hole 13C.

When rotation member 140 is positioned at the second position, first extension portion 141 is disposed so as to extend from the position corresponding to rotation shaft 120 to the + side in the Z-direction, and the part of the first extension portion which supports contact member 150 is positioned on the + side of support portions 11B in the Z-direction.

When placement portion 13 is positioned at the outer position, contact member 150 makes contact with support portions 11B to restrict placement portion 13 from moving to the inner position. Contact member 150 is formed of a shaft member and is disposed along the Y-direction.

Contact member 150 is disposed at a position where the contact member can be brought into contact with two support portions 11B when rotation member 140 is positioned at the first position, and is disposed at a position that is on the + side of two support portions 11B in the Z-direction when rotation member 140 is positioned at the second position. That is, contact member 150 moves, via rotation member 140, between the contact position where the contact member is capable of making contact with support portions 11B and the non-contact position where the contact member does not make contact with support portions 11B.

As illustrated in FIG. 4, biasing member 160 is a spring member that biases contact member 150 toward the contact position, and is disposed at a position between the two cylindrical portions of shaft attachment portions 132 on rotation shaft 120.

Biasing member 160 biases rotation member 140 toward the first position to bias contact member 150 toward the contact position. Therefore, contact member 150 is positioned at the contact position as long as no force toward the – side in the Z-direction is applied to second extension portion 142 of rotation member 140.

That is, when placement portion 13 is positioned at the outer position and battery 2 is not placed on placement portion 13, contact member 150 is positioned at the contact position and can be brought into contact with support portions 11B. Accordingly, placement portion 13 is restricted from moving from the outer position to the inner position.

Further, when battery 2 is placed on placement portion 13, second extension portion 142 is pressed toward the – side in the Z-direction, and rotation member 140 is rotated toward the second position. Therefore, when battery 2 is placed on placement portion 13, contact member 150 is positioned at the non-contact position.

That is, when battery 2 is placed on placement portion 13, contact member 150 is positioned at the non-contact position, and accordingly, the restriction on movement of placement portion 13 from the outer position to the inner position is released.

Next, an operation of restriction section 100 will be described.

When battery 2 is replaced, battery 2 attached to attachment apparatus 10 is pulled out from the inner position in vehicle 1 to the outer position. In this case, the engagement between striker 2A of battery 2 and latch 11C of wall portion 11A of main body portion 11 is first released.

After the engagement between striker 2A and latch 11C is released, placement portion 13 is pulled out from the inner position to the outer position, and the engagement between latch 13A of placement portion 13 and striker 2B of battery 2 is released. Battery 2 is thus removed.

After battery 2 is removed, rotation member 140 is moved from the second position (the position illustrated in FIG. 6B) to the first position (the position illustrated in FIG. 6A) by biasing member 160. Accordingly, contact member 150 is moved from the non-contact position to the contact position.

Consequently, contact member 150 comes into contact with support portions 11B, and placement portion 13 is restricted from moving from the outer position to the inner position.

Here, in the case where restriction section 100 is not disposed, it might happen, depending on the tilted state of the position of vehicle 1 parked, that the placement portion returns to the inner position when the battery is removed.

In contrast, in the present embodiment, restriction section 100 can restrict placement portion 13 from returning from the outer position to the inner position when battery 2 is removed.

Further, when new battery 2 is placed on placement portion 13, second extension portion 142 is pressed toward placement portion 13 by battery 2, and rotation member 140 is rotated from the first position (the position illustrated in FIG. 6A) to the second position (the position illustrated in FIG. 6B).

Accordingly, since contact member 150 moves from the contact position to the non-contact position, the restriction by restriction section 100 is released, and placement portion 13 on which battery 2 is placed can be moved to the inner position.

According to the present embodiment configured as described above, rotation member 140 and the like switch the position of contact member 150 between the contact position and the non-contact position based on the placement state of battery 2 on placement portion 13. Rotation member 140 corresponds to the "switching section" of the present disclosure.

Specifically, rotation member 140 switches the position of contact member 150 from the contact position to the non-contact position when battery 2 is placed on placement portion 13, and rotation member 140 switches the position of contact member 150 from the non-contact position to the contact position when battery 2 is removed from placement portion 13.

Accordingly, rotation member 140 can be rotated to switch the position of contact member 150 in accordance with the operation of replacement of battery 2. Consequently, it is possible to prevent placement portion 13 for placement of battery 2 from returning to the inside of vehicle 1 at a timing unintended by the operator.

When contact member 150 is positioned at the contact position, second extension portion 142 is separated from placement portion 13. Accordingly, in conjunction with the movement of second extension portion 142 caused by the placement of battery 2, first extension portion 141 can be moved such that contact member 150 is positioned at the non-contact position. Consequently, the restriction releasing operation of restriction section 100 can be achieved by rotation member 140 having a simple configuration.

Further, by disposing biasing member 160, first extension portion 141 is biased such that contact member 150 is positioned at the contact position. Consequently, when battery 2 is removed from placement portion 13, contact member 150 can be automatically positioned at the contact position.

Further, second extension portion 142 is inclined away from placement portion 13 with increasing distance away from support portions 11B. Thus, when second extension portion 142 enters through-hole 13C, it is possible to reduce the amount of protrusion of second extension portion 142 toward the − side of through-hole 13C in the Z-direction. Consequently, it is possible to suppress interference between a peripheral member located on the − side of placement portion 13 in the Z-direction and second extension portion 142.

In the above-described embodiment, rotation member 140 implements the rotation operation (switching operation) in accordance with placement of battery 2 on placement portion 13 or removal of battery 2 from placement portion 13, but the present disclosure is not limited to this. For example, the switching operation may be manually performed by an operator, or the switching operation may be automatically performed by a control apparatus.

In the above-described embodiment, the switching section is exemplified as rotation member 140, but the present disclosure is not limited to this. For example, a moving member that supports the contact member such that the contact member moves between the contact position and the non-contact position may be the switching section. The moving member may be any member as long as the contact member is movable between the contact position and the non-contact position, and may, for example, be a member that moves forward and backward between the position where the contact member is positioned at the contact position and the position where the contact member is retracted from the position.

Further, in the above embodiment, second extension portion 142 of rotation member 140 is inclined away from placement portion 13, but the present disclosure is not limited thereto, and may be arranged in parallel with placement portion 13.

Further, in the above embodiment, the contact section is exemplified as contact member 150, but the present disclosure is not limited to this, and any contact member may be used as long as the contact member can be brought into contact with support portions 11B.

Although biasing member 160 is provided in the above-described embodiment, the present disclosure is not limited to this, and the biasing member does not have to be provided. In the case where the biasing member is not provided, the switching section may be operated manually by an operator or by manipulation by a control apparatus.

The embodiments above are no more than specific examples in carrying out the present disclosure, and the technical scope of the present disclosure is not to be construed in a limitative sense due to the specific examples. That is, the present disclosure can be implemented in various forms without departing from its spirit or key features.

This application is entitled and claims the benefit of Japanese Patent Application No. 2023-014064, filed on Feb. 1, 2023, the disclosure of which including the specification, drawings and abstract is incorporated herein by reference in its entirety.

INDUSTRIAL APPLICABILITY

The restriction apparatus of the present disclosure is useful as a restriction apparatus capable of suppressing a placement portion for placement of a battery from returning to the inside of a vehicle at a timing unintended by an operator.

The invention claimed is:

1. A restriction apparatus disposed in a mechanism including a placement portion and a support portion, the placement portion being movable between a mounting position at which a battery is mountable and a replacement position, the support portion being configured to support the placement portion at the mounting position, the restriction apparatus comprising:

a contact section that makes contact with the support portion to limit movement of the placement portion toward the mounting position in a state in which the placement portion is in the replacement position; and a switching section that switches a position of the contact section between a contact position and a non-contact position, the contact position being where the contact section makes contact with the support portion when the battery is not placed on the placement portion, the non-contact position being where the contact section does not make contact with the support portion when the battery is placed on the placement portion.

2. The restriction apparatus according to claim 1, wherein the switching section includes:

a rotation shaft supported by an end portion of the placement portion in the replacement position, the end portion being located on the support portion side, and a rotation member for rotating the contact section about the rotation shaft between the contact position and the non-contact position.

3. The restriction apparatus according to claim 2, wherein: the rotation member includes:

a first extension portion supporting the contact section and disposed to extend from the rotation shaft toward a contact portion of the support portion making contact with the contact section when the contact section is in the contact position, and a second extension portion extending from the rotation shaft in a direction away from the support portion, the second extension portion being disposed at a position that is to be sandwiched between the placement portion and the battery, the second extension portion is spaced apart from the placement portion when the contact section is in the contact position, and in conjunction with movement of the second extension portion caused by placement of the battery on the placement portion, the first extension portion moves such that the contact section is positioned at the non-contact position.

4. The restriction apparatus according to claim 3, further comprising:

a biasing member for biasing the first extension portion toward the contact position.

5. The restriction apparatus according to claim 3, wherein the second extension portion is inclined away from the placement portion with increasing distance away from the support portion.

\* \* \* \* \*